Nov. 14, 1933.  J. J. SCHILLER  1,935,334
BRAKE
Filed March 28, 1932

INVENTOR.
JOHN J. SCHILLER
BY
Jerome R Cox
ATTORNEY.

Patented Nov. 14, 1933

1,935,334

UNITED STATES PATENT OFFICE 1,935,334

BRAKE

John J. Schiller, Cicero, Ill., assignor to Bendix Aviation Corporation, South Bend, Ind., a corporation of Delaware Application March 28, 1932. Serial No. 601,694

2 Claims. (Cl. 188—204)

This invention relates to brakes for automotive vehicles and more particularly to arrangements by which such brakes may be operated.

One of the objects of the invention is to secure equalization of the braking forces applied to each brake of the front pair and to each brake of the rear pair.

A further object of the invention is to secure equalization between each pair of brakes on each side of the vehicle.

A further object of the invention is to provide a "hookup" arrangement in which a single adjustment is effective to adjust the brakes for lining wear, etc.

Among the novel features of the illustrative embodiment of my invention are two pulleys mounted on laterally swinging links one on each side of the vehicle; cables connected to these pulleys and to the rear brakes; another cable extending over these pulleys and thence forward to the front brakes on each side; and means for tensioning the last named cable intermediate the pulleys, comprising a third pulley mounted on a third link.

Further objects and features of the invention will be apparent after a reading of the subjoined specification and claims and after a consideration of the accompanying drawing, in which:

Figure 1:
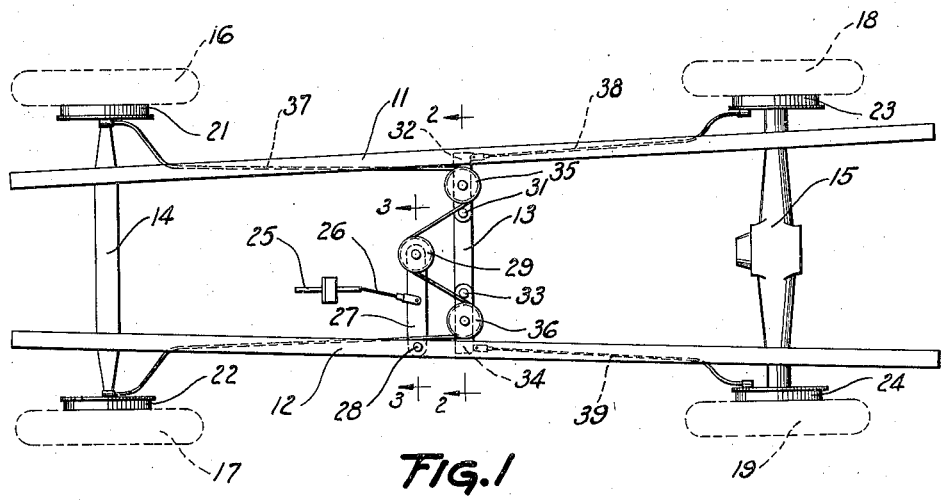
Figure 1 is a diagrammatic plan view of an automobile equipped with a hookup constructed according to my invention.
Figure 2:
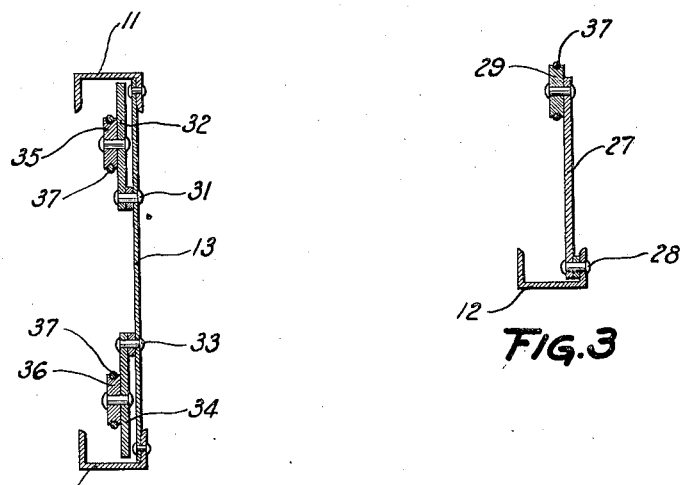
Figure 2 is an enlarged sectional view taken substantially on the line 2—2 of Figure 1.
Figure 3:
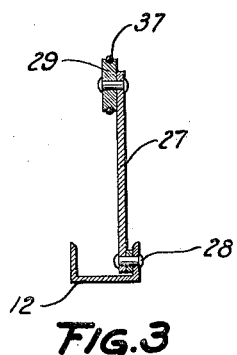
Figure 3 is an enlarged sectional view taken substantially on the line 3—3 of Figure 1.

Referring in detail to the drawing there may be seen a vehicle provided with a chassis formed by side frames 11 and 12 and by a connecting cross frame member 13. The chassis is supported by means of a front axle 14 and a rear axle 15, the former resting upon front wheels 16 and 17, and the latter resting upon rear wheels 18 and 19. The wheels 16, 17, 18, and 19 are equipped with brakes 21, 22, 23, and 24 respectively.

Means are provided for operating the brakes. Mounted at a suitable place upon the vehicle is a pedal 25 connected by a tension member 26 with a horizontally swinging link 27. The link 27 is pivotally mounted as at 28 upon the side frame 12 of the vehicle and carries at its opposite end a pulley 29. Pivotally mounted as at 31 on the cross member 13 adjacent to one side of the vehicle is another horizontally swinging link 32 and pivotally mounted as at 33 on said cross member 13 adjacent to the other side of the vehicle is a third horizontally swinging link 34. The link 32 halfway between the pivot 31 and its opposite end carries a pulley 35 and the link 34 halfway between its pivot 33 and the opposite end carries a pulley 36. Passing around the pulleys 35 and 36 rearwardly of said pulleys and passing around the pulley 29 forwardly of the pulley 29 is a cable 37 which has one end connected with the brake 21 and the opposite end connected with the brake 22. Connected to the outside end of link 32 (i. e. the end opposite the pivot 31) is a cable 38 which is connected with the brake 23 and connected to the outside end (i. e. the end opposite the pivot 33) of the link 34 is a cable 39 having its opposite end connected with the brake 24.

It is believed that the operation of the above described braking system will be clear from the above description. Depression of the pedal 25 moves the pulley 29 and tensions the cable 37. Therefore, force is exerted equally on the brakes 21 and 22. Inasmuch as the force exerted on the pulley 35 is twice that exerted through the cable 37 on the brake 21, and inasmuch as the pulley 35 is located one half of the distance from pivot to the connection with the cable 38, the force exerted on the brake 23 equals the force exerted on the brake 21. Similarly the force exerted on the brake 24 equals the force exerted on the brake 22.

It is to be understood that the above described embodiment of my invention is for the purpose of illustration only and various changes may be made therein without departing from the spirit and scope of the invention.

I claim:

1. A braking system for an automotive vehicle comprising a plurality of brakes, a pair of horizontally swinging links pivoted upon the frame of said vehicle, a pulley mounted on each of said links at a point substantially one-half of the distance between the pivot point and the opposite end of the link, a cable connected to each of said links at said opposite end and to one of said brakes, and a cable passing over said pulleys and connected to others of said brakes.

2. A braking system for an automotive vehicle having a chassis, comprising a plurality of front brakes, a plurality of rear brakes, a pair of links pivotally mounted adjacent the sides of said chassis and in transverse alignment, a pair of pulleys mounted on said links respectively, a third link pivotally mounted on said chassis, a third pulley mounted on said third link in a position substantially central of said chassis but in advance of the transverse line passing through said other pulleys, a cable connected to said forward brakes and passing rearwardly of said aligned pulleys and forwardly of said central pulley, cables connected to said side pulleys and operatively associated with said rear brakes, and means for displacing said central pulley forward.

JOHN J. SCHILLER.